United States Patent [19]
Ulyanitsky et al.

[11] 3,974,423

[45] Aug. 10, 1976

[54] DIFFERENTIAL CURRENT PROTECTIVE DEVICE

[76] Inventors: Evgeny Mefodievich Ulyanitsky, ulitsa Larina,4; Vladimir Semenovich Streltsov, ulitsa pushkinskaya, 43, kv. 1; Vladimir Ivanovich Belichenko, ulitsa Pushkinskaya, 68, kv. 89; Vladimir Vladimirovich Mikhailov, ulitsa B.Khmelnitskogo, 151, kv. 8, all of Novocherkassk Rostovskol Oblasti, U.S.S.R.

[22] Filed: Nov. 1, 1974

[21] Appl. No.: 520,042

[52] U.S. Cl. ............................... 317/26; 317/27 R
[51] Int. Cl.² .......................................... H02H 3/00
[58] Field of Search ............................ 317/26, 27 R

[56] References Cited
UNITED STATES PATENTS 3,573,552  4/1971  Forfod ............................ 317/26 X

*Primary Examiner*—J D Miller
*Assistant Examiner*—Harry E. Moose, Jr.
*Attorney, Agent, or Firm*—Steinberg and Blake

[57] ABSTRACT

A differential current protective device comprising a responsive unit, current transformers feeding a polyphase bridge rectifier, a single-phase bridge rectifier connected to the secondary of a differential transformer, a circuit including two resistors connected across the responsive unit, one of said resistors being connected to the single-phase bridge rectifier pole terminals and the other to the polyphase bridge rectifier pole terminals, and a single half-bridge.

The device is distinguished from the prior art in that the single half-bridge is connected in a parallel opposed relationship to the polyphase bridge rectifier via a resistor of equal resistance in each arm.

5 Claims, 2 Drawing Figures

DIFFERENTIAL CURRENT PROTECTIVE DEVICE

The invention relates to differential current protection and may be advantageously used for the protection of electric power system elements from short-circuits.

The devices employed for the protection of electric power system elements should meet the requirements as to their selectivity, response, sensitivity and reliability.

Differential current protective devices, while possessing the required response, sensitivity and reliability characteristics are absolutely selective.

The operation of differential current protective devices is based on the comparison of currents and their phases at the beginning and end of the section being protected.

In the case of an external short-circuit, the currents at the section extremities flow in the same direction and are equal in magnitude, and when a short-circuit occurs within the section being protected they flow in different directions and, as a rule, are not equal. Thus, by comparing the magnitudes and phases of the currents at the beginning and end of the section being protected, it is possible to identify the location of the fault (short-circuit): whether it is within the section or outside it. Such comparison of current magnitudes and phases is done in a responsive unit of the differential protection device. To achieve the comparison, current transformers having the same ratio of transformation are arranged at the section extremities. The secondaries of these transformers are connected by means of a coupling cable and wired to the responsive unit so that in the case of external short-circuits the responsive unit current equals the difference of the currents at the beginning and end of the section and, when a short-circuit occurs within the section, the responsive unit current is a sum of these currents.

In the case of a short-circuit occurring outside the section being protected, with the equal ratios of transformation and error-free operation of the current transformers, the secondary currents are equal and their difference will be zero and the protection will remain inoperative.

In this way, the differential current protection is non-responsive to external short-circuits, load currents and fluctuations. In fact, the operation of current transformers is not error-free, therefore the secondary currents do not fully coincide in magnitude and phase and their difference will not be equal to zero. This difference is referred to as unbalance current.

The unbalance currents in the differential protective systems may be fairly high in the case of external short-circuits both under transisent and steady-state conditions. The high values of unbalance currents may be due to high multiplicity factors of the short-circuit currents (short-circuit current multiplicity factor is the ratio of the short-circuit current to the rated current through a circuit section), undesired diversity in the types of current transformers at the section extremities, their heavy loading, and connecting wire resistance.

In order to cancel out the effects of the unblance currents, it has been proposed to eomploy retardation in the differential protective systems. In such protective systems the operating current increases with the short-circuit current. This is achieved by the use of short-circuit current controlled mechanical, magnetic or electrical retardation techniques.

There is known a collecting bar differential current protection system wherein the retardation is attained by the use of the maximum absolute sum of the positive and negative half-waves of the connection currents.

This protection comprises current transformers, a polyphase diode rectifier fed by the transformed connection currents, a resistor connected across the polyphase rectifier, and a single half-bridge including two diodes and connected in accumulative parallel relationship to the polyphase rectifier. The differential circuit also includes a current transformer whose primary winding at one extremity is connected to the common point of the single half-bridge diodes and at the other extremity to the secondary winding of the connection current transformers. The differential circuit is an electrical circuit coupling the secondary common point of the current transformers with the common point of the single half-bridge diodes. The current transformer used in the differential circuit is intended for d-c isolation. The secondary winding of the differential circuit current transformer has a rectifier bridge connected thereto. A resistor is connected to the bridge output, which, together with the resistor connected across the polyphase rectifier, forms a comparison circuit. A responsive unit is connected to the comparison circuit resistors.

When an external short-circuit occurs, the current transformers of the faulty connection may be saturated. In this case, the faulty connection current in the primary circuit equals the sum of other feeding connection currents, but in the secondary circuit it is smaller than this sum by the amount of the unbalance current in the differential circuit and has an opposite direction with respect to the feeding connection currents. When the unbalance current is positive, the sum of the positive half-waves will be greater than the sum of the negative half-waves, and when the unbalance current is negative, on the contrary, the positive half-waves sum will be less than the negative half-waves sum.

It should be noted that the unbalance current half-waves flow through the single half-bridge diodes and the greatest of the positive or negative current half-wave sums flows through the resistor connected across the polyphase rectifier.

In the case of a short-circuit within the protected zone, the connection currents coincide in phase. The sum of the positive and negative connection connection current half-waves flows through the resistor connected across the polyphase rectifier and the single half-bridge diodes. Consequently, under these conditions, the retardation does exist and is accomplished by the sum of the half-waves of the currents flowing through the resistor connected across the polyphase rectifier.

It is an object of the present invention to provide a differential current protection having an improved sensitivity achieved by the elimination of the retardation in the case of a short-circuit within the protected zone.

This object is achieved in a differential current protection device comprising a responsive means connected in parallel to series-connected resistors one of which is connected to the pole terminals of a single-phase bridge rectifier fed from a secondary winding of a differential current transformer and the other of which resistors is connected to the pole terminals of a polyphase bridge rectifier fed from secondary windings of a plurality of current transformers, and a single half-bridge connected in a parallel relationship to the polyphase rectifier, and having its common point connected to the differential current transformer primary winding, wherein, according to the invention, said single half-bridge is connected in an opposed relationship to the polyphase bridge rectifier via resistors of equal resistance in each of its arms.

The differential current protection of the present invention will now be described more fully with reference to the accompanying drawings, wherein.

Figure 1:
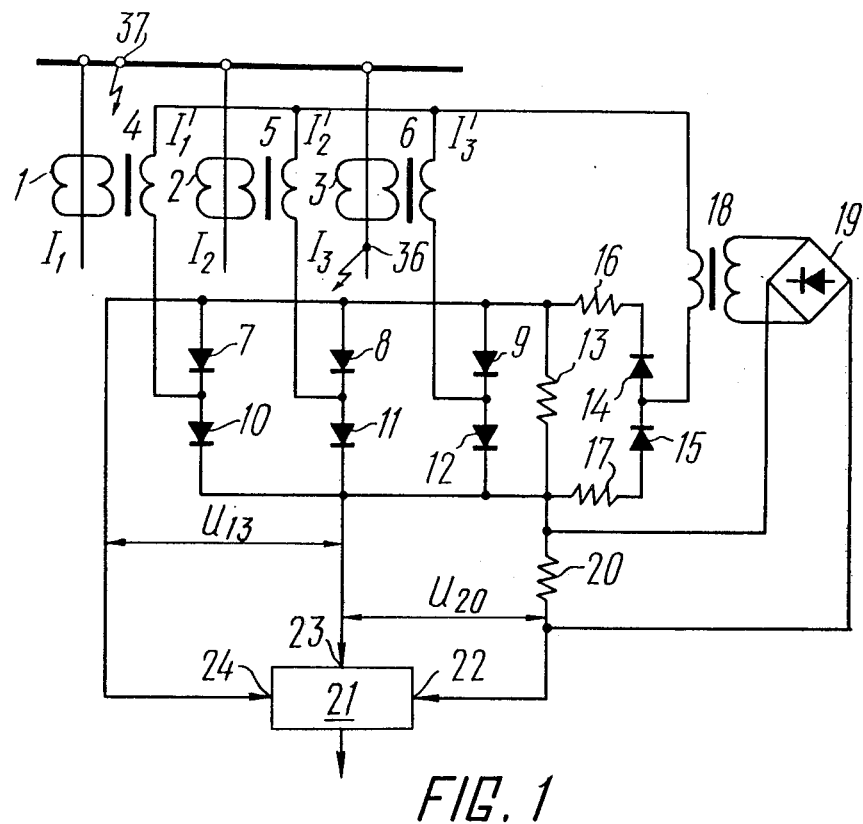
FIG. 1 is an electric circuit diagram of a differential current protection device, according to the invention.

Referring now to FIG. 1, the differential current transformer comprises current transformers 1 through 3 having their primaries in the form of the feeding connection current-carrying parts, intermediary transformers 4 through 6 employed to reduce the loading of the current transformers 1 through 3, a polyphase rectifier including diodes 7 through 12 and fed from the secondary windings of the intermediary transformers 4 through 6, and resistor 13 connected across the polyphase rectifier.

A single half-bridge including two diodes 14, 15 is connected in a parallel opposed relationship to the polyphase rectifier via resistors 16, 17. The resistors 16 and 17 have an equal value. The differential circuit includes a current transformer 18 whose primary winding at one extremity is connected to the common point of the single half-bridge diodes 14, 15 and at the other extremity is connected to the secondary windings of the intermediary transformers 4 through 6. The differential circuit current transformer 18 is used for the d-c isolation of the associated circuits. The secondary winding of the differential circuit current transformer 18 has a rectifier bridge 19 connected thereto. A resistor 20 is connected to the output of the bridge 19. Series-connected resistors 13, 20 are connected across a responsive unit 21 having inputs 22, 23 and 24. The cut-off signal appears at te output of the responsive unit 21 only when the voltage drop on the resistor 20 is greater than that on the resistor 13.

Figure 2:
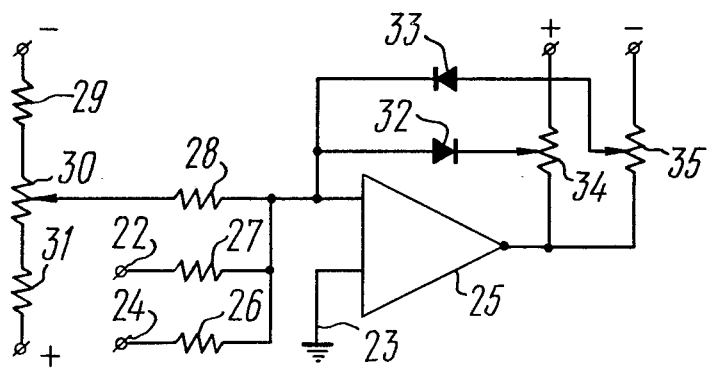
FIG. 2 is an electric circuit diagram of the responsive means employed in the differential current protection device, according to the invention.

As can be seen from FIG. 2, an integrated circuit d-c amplifier 25 may be used as the responsive unit 21. The non-inverting input 23 of the amplifier is grounded and the inverting input (terminals 22, 24) is fed with the voltages $U_{13}$ and $U_{20}$ being compared via resistors 26, 27, 28 as well as with the setting voltage determined by a voltage divider composed of resistors 29, 30, 31. Diodes 32, 33 and resistors 34, 25 ensure overvoltage protection of the amplifier input and limit the output voltage of the amplifier 25 when it operates without negative feedback.

Although for the sake of simplicity, the protection device as shown in FIG. 1 is intended for only three feeding connections, it should be understood by those skilled in the art that it may have any other configuration to handle a greater number of feeding connections.

The operation of the differential current protection is as follows.

When a short-circuit occurs outside the protected zone (e.g. at a point 36), the connections currents $I_1$ and $I_2$ have a direction opposite to that of the current $I_3$. The currents flowing in the primary windings of the current transformers 1 through 3, i.e. in the feeding connections, will be hereinafter referred to as currents $I_1$, $I_2$, $I_3$, respectively, and the currents flowing in the secondary windings of the current intermediary transformers 4 through 6 will be referred to as currents $I_1'$, $I_2'$, $I_3'$. The short-circuit current which is a sum of the currents $I_1$ and $I_2$ flowing in the primary of the current transformer 3 will result in its saturation.

Hence, the secondary current of the current intermediary transformer 6 will be smaller than the sum of the currents $I_1'$ and $I_2'$. The positive half-waves of the currents $I_1'$ and $I_2'$ will pass through the diodes 10, 11. A portion of the current sum $(I_1' + I_2')$ which equals the current $I_3$ will pass through the resistor 13, diode 9, secondary winding of the current intermediary transformer 6 towards the opposite terminals of the current transformers 4, 5. A minor portion of the summed current which equals the difference $(I_1' + I_2') - I_3'$ will flow through the resistor 17, diode 15 and primary winding of the transformer 18 towards the opposite terminals of the secondary windings of the current transformers 4, 5. The difference $(I_1' + I_2') - I_3'$ is commonly referred to as the unbalance current. The unbalance current is a minor portion of the sum $(I_1' + I_2')$, since the resistance of the circuit including the resistor 13 and saturated intermediary transformer 6 is much lower than the value of the resistor 17.

During the next half-cycle, the currents reverse their directions. A portion of the current sum $(I_1' + I_2')$ equal to the current $I_3$ will flow through the secondary winding of the current transformer 6, diode 12, resistor 13 and diodes 7, 8 towards the opposite terminals of the secondary windings of the current transformers 4, 5. Thus, at the appearance of both the positive and negative half-waves, when the short-circuit occur outside the protected zone (at point 36), the difference of the voltage drops on the resistors 20 and 13 will be smaller than the setting of the responsive unit 21 and the protection is retarded or inhibited. No signal is available at the ouput of the responsive unit 21.

In the case of a short-circuit within the protected zone (e.g. at a point 37), the connections currents have the same directions.

The positive half-waves of the currents $I_1'$, $I_2'$ and $I_3'$ flow through the diodes 10, 11, 12, resistor 17, diode 15 and primary winding of the tranformer 18 towards the opposite terminals of the secondary windings of the current transformers 4 through 6. The negative half-waves of the currents $I_1'$, $I_2'$, $I_3'$ will flow through the primary of the transformer 18, diode 14, resistor 15, diodes 7 through 9 towards the opposite terminals of the secondary windings of the current transformers 4 through 6. There will be no current through the resistor 13 since when the direction of the currents $I_1'$, $I_2'$ and $I_3'$ is positive the diode 14 will be non-conducting, and when it is negative, the diode 15 will become non-conducting. Besides, the resistance of the unsaturated current transformers 4 through 6 is extremely high. In this case, the difference of the voltage drops across the resistors 20 and 13 is greater than the setting voltage, and a signal will appear at the output of the responsive unit 21.

Thus, the absence of a voltage drop across the resistor 13 in the case of a short-circuit within the protected zone (at the point 37) will provide for improving the protection sensitivity.

Thus it will be seen that the power system or the like which forms the zone to be protected is connected by way of the device of the invention to the responsive means 21 in such a way that the components 14–17 form a means connected across the resistor 13 and to the primary of the differential transformer 18 for providing between resistors 13 and 20 a differential voltage which is too small to provide a signal at the responsive means 21 in the event that a fault such as a short-circuit occurs outside the protected zone while achieving a maximum differential between the voltage drops across the resistors 13 and 20 in the event that a fault such as a short circuit occurs within the protected zone, so that by reason of this latter maximum differential an output signal at the responsive means 21 will be assured. Furthermore, it will be noted that the means formed by way of the components 14–17 achieves this maximum differential in the case of an internal fault by preventing any voltage drop from occurring across the resistor 13 so that the maximum differential for assuring a signal at the responsive means 21 is achieved.

What is claimed is:

1. A differential current protective device for providing a signal when a fault such as a short-circuit occurs within a zone formed by a system which is to be protected while providing no signal when such a fault occurs outside of said zone, comprising a polyphase bridge rectifier, a plurality of current transformers connected to the system forming the zone which is to be protected, said current transformers feeding said polyphase bridge rectifier, a differential current transformer having primary and secondary windings, a single-phase bridge rectifier connected to said secondary winding of said differential transformer, each of said rectifiers having pole terminals, responsive means for providing said signal, a circuit including at least two resistors connected across said responsive means, one of said resistors being connected to said pole terminals of said single-phase bridge rectifier and the other of said resistors being connected to said pole terminals of said polyphase bridge rectifier, and means connected across said other resistor and also connected to said primary winding of said differential current transformer for providing between said resistors a voltage differential of a given minimum magnitude when a fault occurs outside of said zone and a voltage differential of a given maximum value when a fault occurs within the zone to be protected, said responsive means requiring for response a voltage greater than said minimum voltage but substantially less than said maximum voltage but a substantially less than said maximum voltage so that a signal is provided by said responsive means only when a fault occurs within the zone to be protected.

2. The combination of claim 1 and wherein said means connected across said other resistor and to said primary winding of said differential transformer provides at said other resistor an absence of a voltage drop in the event of a fault in the zone to be protected, so as to achieve said maximum voltage differential.

3. The combination of claim 2 and wherein said means connected across said other resistor and to said primary winding of said differential transformer includes a single half-bridge connected in parallel opposed relationship to said polyphase bridge rectifier by way of a pair of arms which respectively have resistors of equal value therein, said half-bridge having a common point connected to said primary winding of said differential transformer.

4. The combination of claim 3 and wherein said responsive means includes an integrated circuit amplifer having a non-inverting grounded input and an inverting input formed by said circuit which is connected across said responsive means.

5. The combination of claim 1 and wherein said responsive means includes an integrated circuit amplifier having a non-inverting grounded input and an inverting input formed by said circuit connected across said responsive means.

* * * * *